(12) United States Patent
Kyakuno

(10) Patent No.: US 10,356,431 B2
(45) Date of Patent: Jul. 16, 2019

(54) MOVING IMAGE REPRODUCTION METHOD AND MOVING IMAGE REPRODUCTION SYSTEM

(71) Applicant: AXELL CORPORATION, Chiyoda-ku, Tokyo (JP)

(72) Inventor: Kazuki Kyakuno, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 115 days.

(21) Appl. No.: 14/524,136

(22) Filed: Oct. 27, 2014

(65) Prior Publication Data

US 2015/0350664 A1 Dec. 3, 2015

(30) Foreign Application Priority Data

May 30, 2014 (JP) .................................. 2014-113256

(51) Int. Cl.
*H04N 19/44* (2014.01)
*H04L 29/06* (2006.01)
(Continued)

(52) U.S. Cl.
CPC ............. *H04N 19/44* (2014.11); *H04L 65/60* (2013.01); *H04L 67/02* (2013.01); *H04N 19/107* (2014.11);
(Continued)

(58) Field of Classification Search
CPC ................................. H04L 65/60; H04L 67/02
(Continued)

(56) References Cited

U.S. PATENT DOCUMENTS 5,706,367 A * 1/1998 Kondo .................... H04N 5/781
348/415.1
5,812,787 A * 9/1998 Astle ..................... H04N 19/503
348/586
(Continued)

FOREIGN PATENT DOCUMENTS

CN 1757240 4/2006
EP 2629520 8/2013
(Continued)

OTHER PUBLICATIONS

Brady, Noel., "MPEG-4 Standardized Methods for the Compression of Arbitrarily Shaped Video Objects", Dec. 1999, IEE Transactions on Ciruits and Systems for Video Technology, vol. 9, No. 8.*
(Continued)

*Primary Examiner* — William C Vaughn, Jr.
*Assistant Examiner* — Joseph Daniel A Towe
(74) *Attorney, Agent, or Firm* — Wenderoth, Lind & Ponack, L.L.P.

(57) ABSTRACT

A moving image reproduction method includes: dividing data of each of plural frames of a moving image to be displayed on a client terminal using a browser into blocks; judging whether each of the blocks has same information in the preceding frame; obtaining compressed data by encoding each block for which the preceding frame does not have the same information by a method compatible with a still image decoder; preparing compressed still image data in which the compressed data are arranged in succession; describing, for each block, information indicating presence/absence of the same information into image restoration information; preparing image restoration compressed information by encoding the image restoration information; and preparing a display program which is written in a description language
(Continued)

that can be interpreted by the browser for reconstructing the data of moving image.

7 Claims, 10 Drawing Sheets

(51) Int. Cl.
    *H04L 29/08*     (2006.01)
    *H04N 19/503*     (2014.01)
    *H04N 19/176*     (2014.01)
    *H04N 19/46*     (2014.01)
    *H04N 19/51*     (2014.01)
    *H04N 19/513*     (2014.01)
    *H04N 19/593*     (2014.01)
    *H04N 19/107*     (2014.01)
    *H04N 19/137*     (2014.01)

(52) U.S. Cl.
    CPC ......... *H04N 19/137* (2014.11); *H04N 19/176* (2014.11); *H04N 19/46* (2014.11); *H04N 19/503* (2014.11); *H04N 19/51* (2014.11); *H04N 19/513* (2014.11); *H04N 19/593* (2014.11)

(58) Field of Classification Search
    USPC .................................................... 375/240.16
    See application file for complete search history.

(56) References Cited

U.S. PATENT DOCUMENTS

| | | | |
|---|---|---|---|
| 6,055,565 A | 4/2000 | Inai | |
| 9,137,546 B2 | 9/2015 | Won et al. | |
| 2006/0204115 A1 | 9/2006 | Burazerovic | |
| 2009/0244091 A1* | 10/2009 | Horio | H04N 7/173 345/619 |
| 2011/0064142 A1* | 3/2011 | Haskell | G09G 5/377 375/240.25 |
| 2011/0200112 A1 | 8/2011 | Won et al. | |
| 2012/0128058 A1 | 5/2012 | Bakharov et al. | |
| 2013/0215291 A1* | 8/2013 | Baek | H04N 7/26867 348/231.99 |
| 2014/0032406 A1* | 1/2014 | Roach | G06Q 20/042 705/42 |
| 2014/0049566 A1* | 2/2014 | Sudou | G09G 5/38 345/681 |
| 2014/0281894 A1* | 9/2014 | Maity | G06F 9/4445 715/234 |
| 2015/0179130 A1* | 6/2015 | Smadi | G09G 5/006 345/520 |
| 2015/0209680 A1* | 7/2015 | Lim | A63F 13/87 463/31 |
| 2015/0229925 A1 | 8/2015 | Won et al. | |

FOREIGN PATENT DOCUMENTS

| | | | | |
|---|---|---|---|---|
| JP | 09-288677 | 11/1997 | | |
| JP | 2008-085502 | 4/2008 | | |
| JP | 2009-194415 | 8/2009 | | |
| JP | 2009-245254 | 10/2009 | | |
| JP | 2012-114909 | 6/2012 | | |
| KR | 1019980048654 | 9/1998 | | |
| KR | 100748625 | 8/2007 | | |
| KR | 10-2008-0105283 | 12/2008 | | |
| KR | 10-1377527 | 4/2010 | | |
| KR | 10-2004-0003147 | 1/2013 | | |
| WO | 2002/089486 | 11/2002 | | |
| WO | WO 02089486 A2 * | 11/2002 | ......... | H04N 21/8166 |
| WO | WO-02089486 A2 * | 11/2002 | ......... | H04N 21/8166 |

OTHER PUBLICATIONS

Brady, Noel., "MPEG-4 Standardized Methods for the Compression of Arbitrarily Shaped Video Objects", Dec. 1999, IEEE Transactions on Circuits and Systems for Video Technology, vol. 9, No. 8.*
Brady, N., MPEG-4 Standardized Methods for the Compression of Arbitrarily Shaped Video Objects, IEEE Transactions on Circuits and Systems for Video Technology, 1999, vol. 9, No. 8, pp. 1170-1189.
Extended European Search Report, dated Feb. 9, 2015, in corresponding European Patent Application No. 14190616.4.
Notice of Rejection dated Feb. 26, 2016, in corresponding Korean application No. 10-2014-0147013 with English translation.
Office Action dated Aug. 12, 2015, in corresponding Korean application No. 10-2014-0147013 with English translation.
Office Action dated May 12, 2016, in corresponding Korean application No. 10-2016-0038062 with English translation.
Office Action dated Jan. 19, 2017 in corresponding Korean Patent Application No. 10-2016-0038062 with English translation.
Notification of Reasons for Refusal dated Aug. 8, 2017 in corresponding Japanese Patent Application No. 2014-113256 with English translation.
Office Action dated Nov. 1, 2017 in Chinese Patent Application No. 201410586852.3, with English-language translation.
Korean Notification of Reason for Refusal dated Apr. 30, 2018 in corresponding Korean Patent Application No. 10-2016-0038062 with English Translation.
Chinese Office Action dated Sep. 3, 2018 in corresponding Chinese Patent Application No. 201410586852.3 with English translation.

* cited by examiner

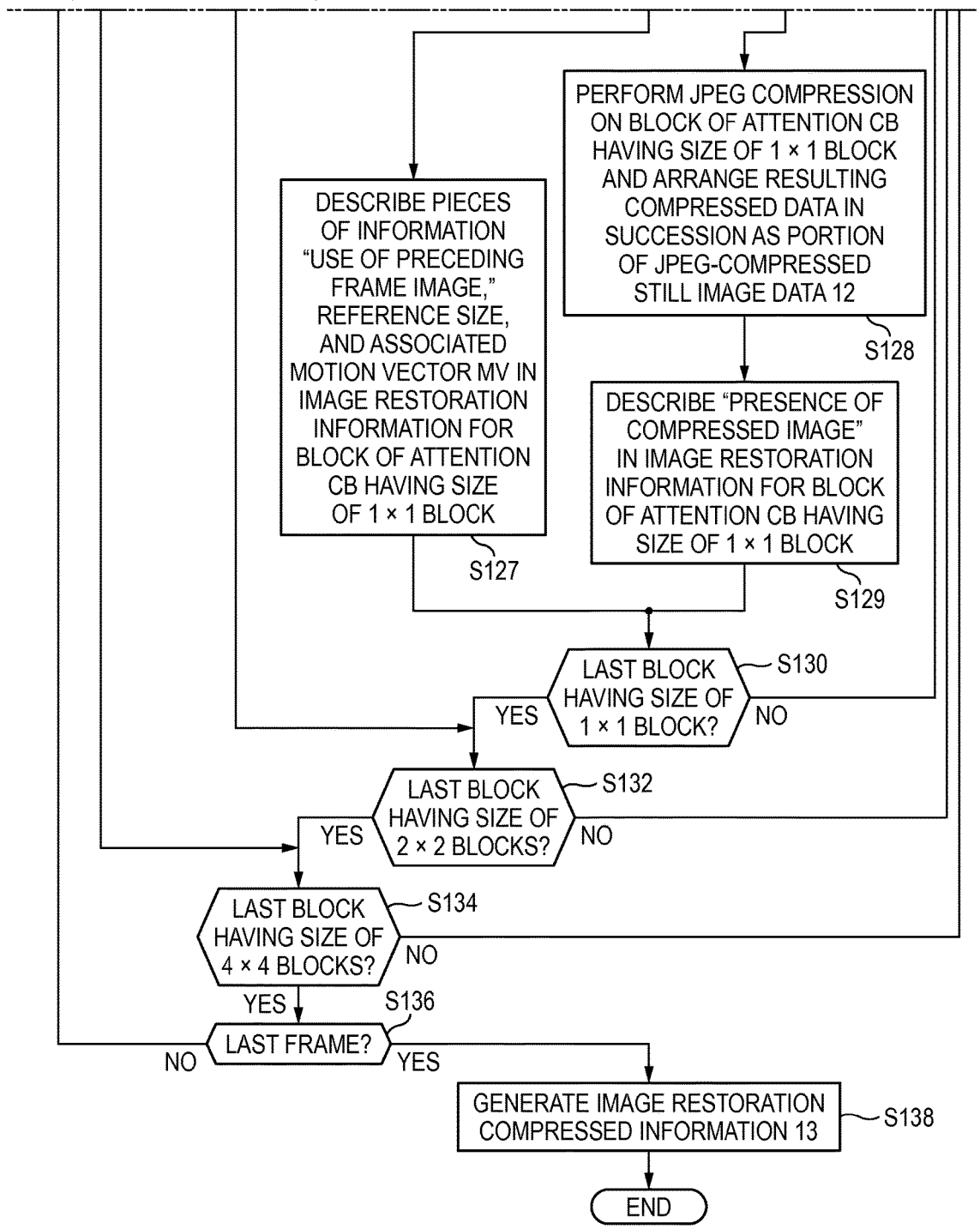

MOVING IMAGE REPRODUCTION METHOD AND MOVING IMAGE REPRODUCTION SYSTEM

CROSS-REFERENCE TO RELATED APPLICATIONS

This application is based on and claims priority under 35 USC 119 from Japanese Patent Application No. 2014-113256 filed on May 30, 2014, the entire content of which is incorporated herein by reference.

BACKGROUND

1. Technical Field

The present invention relates to a moving image reproduction method and a moving image reproduction system. More particularly, the invention relates to a moving image reproduction method and a moving image reproduction system that use a still image decoding function that is incorporated as a standard function in a browser.

2. Related Art

With the spread of the Internet, individuals have come to browse, on their own terminals, information provided on the Internet using browsing-dedicated software called a browser. In particular, the recent development of both of the communications technologies and the information compression-coding technologies have made it possible to browse images, in particular moving images, smoothly without any suspensions.

For that matter, for browsers to enable satisfactory browsing of moving images on the Internet without causing any problems, from the viewpoints of the communication rate and the information amount it is a common practice to embed a high-functionality decoder of MPEG4 (Moving Picture Experts Group phase 4), H.264, or a like standard in a browser in the form of a plug-in or incorporate a like function in a browser in the form of a dedicated application (refer to Patent Literature 1 (JP-A-H9-288677) (paragraph [0029], lines 1-2 and paragraph [0030], lines 11-14), for example). Although Patent Literature 1 assumes a system in which moving image information is secured on the side of client terminal, in general moving image information is also provided for web servers on the Internet.

The above-mentioned techniques such as the plug-in technique enable substantial moving image reproduction through information amount reduction in the time-axis direction beyond the abilities of a browser's standard decoding function (JPEG (Joint Photographic Experts Group) decoding function and PNG (portable network graphics) decoding function.

SUMMARY OF INVENTION

However, above-mentioned techniques such as the plug-in technique are additive ones that depend on the hardware of a terminal and are not intended to be versatile. In smartphones which have rapidly come into wide use recently, they are incapable of automatic moving image reproduction and cannot reproduce a portion of a webpage or reproduce plural moving images simultaneously.

On the other hand, as in, for example, Motion JPEG, it is possible to reproduce a moving image in the form of a flipbook-like moving image by applying a standard-equipped JPEG decoding function to each of frames constituting the moving image and displaying resulting frames in series by a JavaScript (registered trademark) program.

However, in this kind of technique, the compression ratio is small because redundant information is not reduced in the time-axis direction; it can not necessarily exhibit sufficient performance depending on the communication rate of a transfer channel. Another approach would be incorporate a high-functionality decoding function of H.264 or the like into a browser using JavaScript. This approach has a problem that it cannot assure a sufficiently high reproduction rate because of incapability of using hardware acceleration.

The present invention has been made in the above circumstances, and an object of the present invention is to provide a moving image reproduction method and a moving image reproduction system which can reproduce a compressed moving image smoothly without causing any problems using a still image decoder that is incorporated in a browser for the purpose of versatility, that is, less dependence on reproduction terminals, in the same manner as in the case of using a moving image decoder.

According to an aspect of the invention, it provides a moving image reproduction method comprising: dividing data of each of plural frames of a moving image to be displayed on a client terminal using a browser into blocks; judging whether each of the blocks has same information in the preceding frame; obtaining compressed data by encoding each block for which the preceding frame does not have the same information by a method compatible with a still image decoder, the still image decoder being incorporated as a standard component in the browser; preparing compressed still image data in which the compressed data are arranged in succession; describing, for each block, information indicating presence/absence of the same information into image restoration information; preparing image restoration compressed information by encoding the image restoration information; and preparing a display program which is written in a description language that can be interpreted by the browser; and causing the browser to execute the display program to causes the client terminal to display the reconstructed data of the moving image, wherein the execution of the display program comprises: obtaining the image restoration information and still image data by decoding the image restoration compressed information and the compressed still image data, respectively; and then reconstructing the data of the moving image formed by the plural frames by employing, for each block, one of (i) the information in the preceding frame in response to the presence/absence information of the block described in the image restoration information indicating "presence" and (ii) image data of a corresponding block of the still image data in response to the presence/absence of the information of the block described in the image restoration information indicating "absence".

The moving image reproduction method may have a process in which, in describing the presence/absence information in the image restoration information, for each block, whose presence/absence information indicates "presence," a motion vector indicating a positional relationship with the preceding frame is described, and in reconstructing the data of the moving image, for each block whose presence/absence information indicates "presence," the information in the preceding frame on the basis of the motion vector is employed.

The moving image reproduction method may have a process in which, the still image decoder incorporated as the standard component in the browser is a JPEG decoder.

The moving image reproduction method may have a process in which, each of the blocks has a size of 8×8 pixels which is a unit of processing of a JPEG encoder.

The moving image reproduction method may have a process in which, the presence/absence information and the motion vector in the image restoration information are correlated with R, G, and B values of image information, and the image restoration compressed information is prepared by encoding the image restoration information by a PNG method.

The moving image reproduction method may have a process in which, in judging whether the preceding frame has the same information, a range formed of n×n blocks being a range for the judgment as to presence/absence of same information is narrowed gradually by decreasing k where n indicates $2^k$ and k indicates an integer that is larger than or equal to 1.

The moving image reproduction method may have a process in which, information indicating the range where the presence of the same information is found is included in the image restoration information.

The moving image reproduction method may have a process in which, the description language is HTML5.

The moving image reproduction method may have further includes: preparing transparency information compressed information by encoding information relating to transparency of the moving image as an alpha channel, wherein the execution of the display program further comprises: decoding the transparency information compressed information, and the data of the moving image is reconstructed from the compressed still image data by incorporating the information relating to transparency into the data of the moving image.

The moving image reproduction method may have a process in which, in preparing the compressed still image data, the compressed still image data is prepared as a plurality of divided compressed still image data in accordance with a still image handling capacity of the client terminal.

The moving image reproduction method may have a process in which, the compressed still image data, the image restoration compressed information, and the display program are stored in web server that is connected to the client terminal via a network.

Another aspect of the invention, it provides a moving image reproduction system comprising: a client terminal that is provided with a browser; and a web server that is connected to the client terminal via a network, wherein the web server includes compressed still image data, image restoration compressed information and a program, the compressed still image data which is prepared by dividing data of each of plural frames of a moving image into blocks and, for each block having no same information in the preceding frame, and obtaining compressed data by encoding the block by a method compatible with a still image decoder, where the still image decoder being incorporated in the browser as a standard component, and the compressed data are arranged in succession in the compressed still image data; the image restoration compressed information which is prepared by describing, for each block, information indicating presence/absence of the same information into image restoration information, and encoding the image restoration information; and the program which is written in a description language that can be interpreted by the browser and is to be downloaded to the client terminal and executed by the browser, and the program serves to obtain the image restoration information and still image data by decoding the image restoration compressed information and the compressed still image data, respectively, reconstruct the data of the moving image formed by the plural frames by employing, for each block, one of (i) the information in the preceding frame in response to the presence/absence information of the block described in the image restoration information indicating "presence" and (ii) image data of a corresponding block of the still image data in response to the presence/absence of the information of the block described in the image restoration information indicating "absence", and cause the client terminal to display the reconstructed data of the moving image.

According to any aspect of the moving image reproduction method and the moving image reproduction system, only the standard decoding function of the browser is used in reproducing a moving image by decoding compressed moving image using the browser. As a result, the compressed moving image providing can have a compressed moving image generation environment that is less dependent on terminals. And smooth moving image reproduction can be realized by setting the compression ratio sufficiently high.

More specifically, the browser displays a moving image on the client terminal using the still image decoder that is standard-equipped in the browser instead of a plug-in or the like of a moving image decoder. This lightens the necessary advance processing and enhances the versatility. Furthermore, a necessary display rate can be secured because the still image decoder is used differently than in the case of a flipbook-like moving image in which individual frames are decoded independently to produce a moving image, that is, information of an original moving image is converted into compressed still images using interframe motion compensation.

In judging whether the preceding frame has the same information, the range for the judgment as to the preceding frame has the same information, a range formed of n×n blocks being a range for the judgment as to presence/absence of same information is narrowed gradually by decreasing k where n indicates $2^k$ and k indicates an integer that is larger than or equal to 1. This measure provided, in addition to the above advantages, the process of generating compressed still image data and image restoration compressed information can be simplified and the information amount of the image restoration compressed information can be decreased.

Transparency information compressed information may be prepared by encoding information relating to transparency (alpha channel) of the moving image. And the display program may be written so as to decode the transparency information compressed information and to reconstruct the data of the moving image from the compressed still image data by incorporating the information relating to transparency into the data of the moving image. For example, this measure makes it possible to reproduce plural moving images in superimposition.

DESCRIPTION OF EMBODIMENTS

Exemplary Embodiments of the present invention will be hereinafter described in detail with reference to the drawings.

Figure 1A:
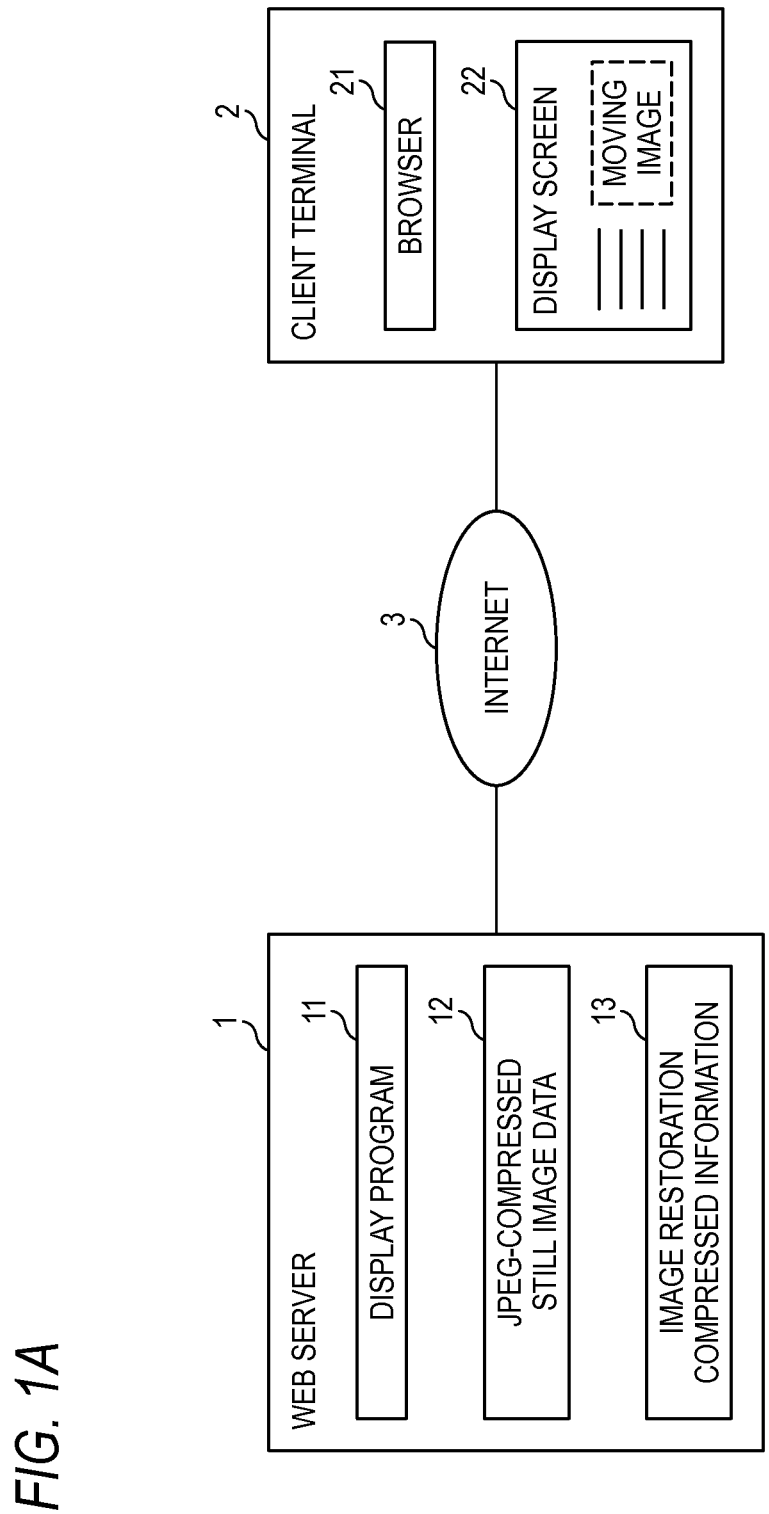
FIGS. 1A to 1D outline moving image reproduction methods and moving image reproduction systems according to embodiments of the present invention.

FIGS. 1A to 1D outline moving image reproduction methods and moving image reproduction systems according to the embodiments of the invention. FIG. 1A shows an example moving image display system in which a client terminal 2 owned by an information referencing party can communicate with a web server 1 over the Internet 3.

The client terminal 2 at least includes a browser 21 and a display screen 22. The display screen 22 can displays various kinds of text information, various still images, and various moving images. The browser 21 is software that reads and interprets a program written in a page description language and displays text information, a still image, and/or moving image according to the program. Page description languages that can be interpreted by the browser 21 are languages that are compatible with at least the HTML5 (Hyper Text Markup Language version 5) standard. FIG. 1A shows only features directly relating to the embodiment; although the client terminal 2 is also equipped with various other hardware components such as a processor capable of executing various kinds of software including the browser 21, a memory, and a processing unit dedicated to display control for the display screen 22, they will not be described here.

For example, the client terminal 2 is a portable information terminal such as a personal computer or a smartphone. In the case of a smartphone, various connection modes are available in which connection to the Internet 3 is established via what is called a 3G line or a 3.9G line of LTE (Long Term Evolution), WiMAX (registered trademark), or the like or is established directly by communicating with a wireless LAN router by Wi-Fi (registered trademark).

On the other hand, the web server 1 at least includes a display program 11, JPEG-compressed still image data 12, and image restoration compressed information 13. The JPEG-compressed still image data 12 are data obtained by compression-coding, by a moving image constituent images JPEG compression method with interframe motion compensation (described later), moving image information generated for display in plural terminals such as the client terminal 2 that are connected to the Internet 3. As described later in detail, the JPEG-compressed still image data 12 are data generated as JPEG-compressed data of still images by performing the above particular processing on moving image information consisting of plural frames.

As described later in detail, the image restoration compressed information 13 is information obtained by compression-coding conversion information and motion compensation information that are generated in converting a moving image to enable its handling as still images by the moving image constituent images JPEG compression method with interframe motion compensation. And the image restoration compressed information 13 is information to be referred to when the JPEG-compressed still image data 12 are expanded and a moving image is thereby reconstructed in the client terminal 2. The image restoration compressed information 13 may simply be binary data in base 64 format. However, from the viewpoint of information amount reduction and capability of being processed in standard form in the browser 21, it is preferable that the image restoration compressed information 13 be regarded as images and formed as PNG image data by PNG compression processing.

The display program 11 is a program that is written in a language that can be interpreted by the browser 21 of the client terminal 2. Interpreted by the browser 21 in the client terminal 2, the display program 11 serves to restore the original moving image from the JPEG-compressed still image data 12 while referring to the image restoration compressed information 13 and to display it on the display screen 22 of the client terminal 2 together with text information. More specifically, the display program 11 is written in JavaScript and a description language that is compatible with HTML5.

An ordinary procedure would be that the display program 11, the JPEG-compressed still image data 12, and the image restoration compressed information 13 are generated by a terminal other than the web server 1 and uploaded to the web server 1 after their completion. The display program 11, the JPEG-compressed still image data 12, and the image restoration compressed information 13 need not always be stored in the same web server as in this embodiment and may be stored in different servers.

Figure 1B:
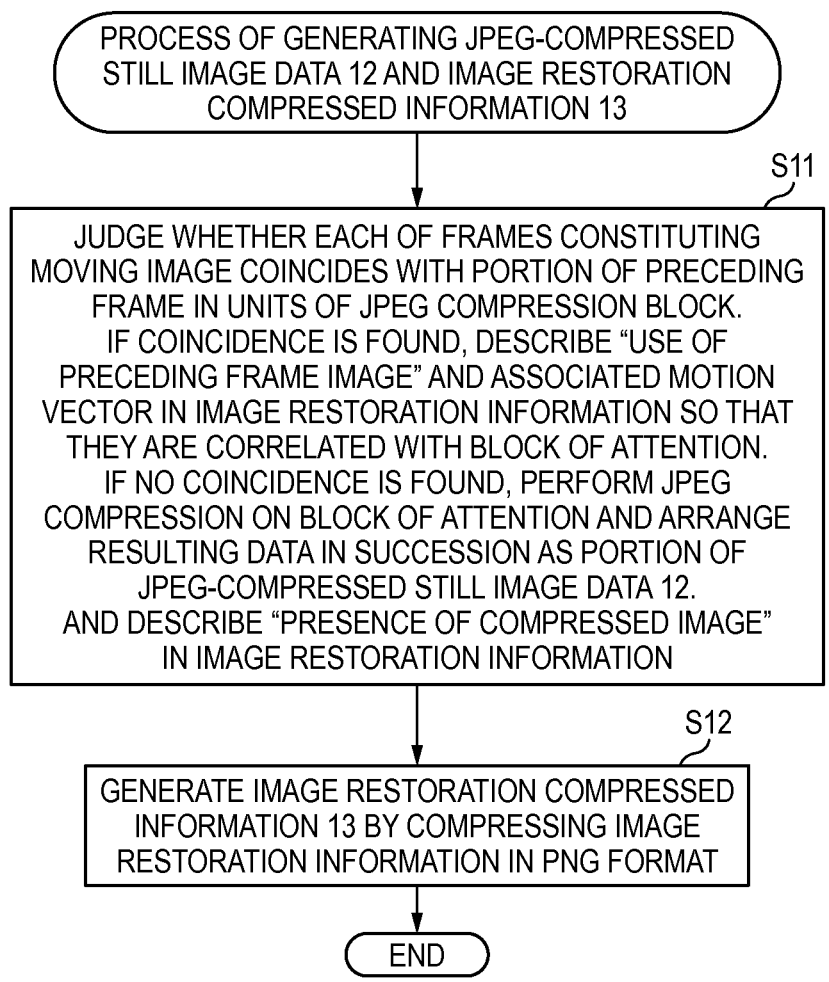

FIG. 1B is a flowchart of a process of generating JPEG-compressed still image data 12 and image restoration compressed information 13 in the moving image reproduction methods and the moving image reproduction systems according to the embodiments of the invention using what is called the moving image constituent images JPEG compression method with interframe motion compensation.

In general, an information providing party stores, in a web server, in a compressed state, a still image and a moving image they want an information referencing party to refer to. In contrast, in the embodiments of the invention, JPEG-compressed still image data 12 are generated as a compressed version of moving image data and image restoration compressed information 13 is generated as appended information.

JPEG-compressed still image data 12 and image restoration compressed information 13 are generated in the following manner. Plural frames of moving image data are each divided into blocks of 8×8 pixels, and each block is compression-coded by the JPEG compression method. Resulting blocks are arranged in succession and regarded as a JPEG-compressed still image. And the concept of motion compensation is employed between frames. When the preceding frame has the same information as the block of attention, no compressed data is generated for this block and the information in the preceding frame is used instead. For each block, information indicating whether to use information in the preceding frame or not and other information are described in image restoration compressed information 13.

Using the JPEG compression method in the above manner makes it possible to process moving image data by a decoder that is standard-incorporated in the browser 21. In addition, the employment of the motion compensation using motion vectors increases the compression ratio and decreases the information amount. However, taking the processing load of the browser 21 into consideration, differential compression processing is not performed.

Stated a little more specifically, as shown in FIG. 1B, at step S11, it is judged whether or not each of frames constituting a moving image coincides with a portion of the preceding frame in units of a JPEG compression block. If coincidence is found, "use of a preceding frame image" and an associated motion vector are described in image restoration information so as to be correlated with the block of attention. If no coincidence is found, the block of attention is subjected to JPEG compression and the compressed data is arranged in succession as a portion of JPEG-compressed still image data 12. And "presence of a compressed image" is described in the image restoration information. If step S11 has been executed to the last frame and the JPEG-compressed still image data 12 and the image restoration information have been completed, image restoration compressed information 13 is generated at step S12 by compressing the image restoration information in PNG format. The information providing party stores the thus-generated JPEG-compressed still image data 12 and image restoration compressed information 13 in the web server 1.

Since the JPEG compression processing includes quantization processing, in the above coincidence/non-coincidence judgment it is necessary to take quantization error of the JPEG compression processing into consideration. In addition, taking into account a code amount that occurs when non-coincidence is found, there exists a case that making a judgment "coincident" produces a better result even if relatively large quantization error occurs. Therefore, in making a coincidence/non-coincidence judgment, it is appropriate to determine a value of the λ parameter of RDO (rate distortion optimization) from quantization coefficients of the JPEG compression processing, calculating costs that are caused by respective judgments "coincident" and "non-coincident," and employs one with a lower cost. More specifically, the cost can be calculated on the basis of a squared error from an original image of coding done in a certain mode and a resulting code amount according to the equation cost=λ×(code amount)+(squared error). Making a judgment "coincident" if doing so will result in a lower cost is preferable from the viewpoint of balance between the code amount and the image quality.

Figure 1C:
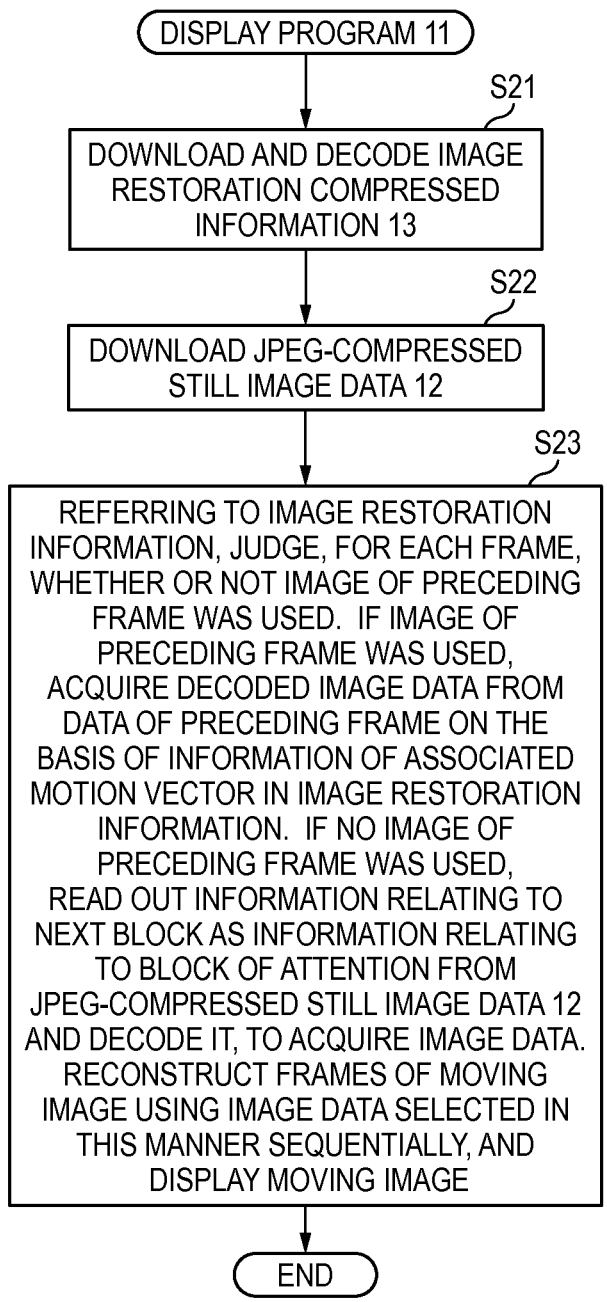

FIG. 1C is a flowchart that outlines a process that corresponds to the process shown in FIG. 1A and that is executed by the display program 11 which is downloaded, interpreted, and executed by the browser 21 of the client terminal 2. As mentioned above, the display program 11 is a program that is written in JavaScript and a description language that is compatible with HTML5 and that is generated by the information providing party according to the ways the policy of generation of the JPEG-compressed still image data 12 and the image restoration compressed information 13 are generated.

The display program 11 will be outlined below with reference to FIG. 1C. At step S21, the image restoration compressed information 13 is downloaded from the web server 1 and decoded, whereby the image restoration information is restored. At step S22, the JPEG-compressed still image data 12 are downloaded. At step S23, the image restoration information is referred to and it is judged for each block whether or not an image of the preceding frame was used. If an image of the preceding frame was used, decoded image data is acquired from the data of the preceding frame on the basis of information of an associated motion vector in the image restoration information. If no image of the preceding frame was used, it means that information that should be employed as information of the block of attention exists in the downloaded JPEG-compressed still image data 12. Therefore, information relating to the next block is read from the JPEG-compressed still image data 12 as information relating to the block of attention and is subjected to decoding processing, whereby image data is acquired. The image data selected in the above manner is employed as image data relating to the block of attention and set in place as image data in the frame of the moving image. The frames of the moving image are reconstructed in this manner and the moving image is displayed.

Figure 1D:
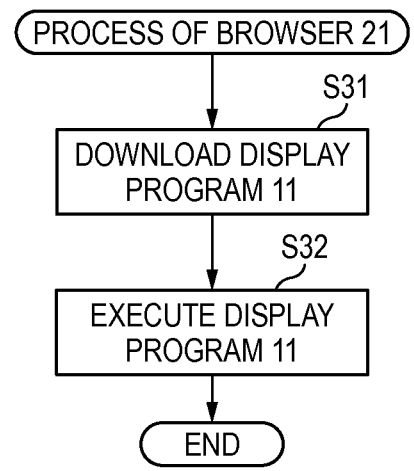

FIG. 1D is a flowchart that outlines a process that is executed by the browser 21. If the owner of the client terminal 2, that is, the information referencing party, inputs a URL (uniform resource locator) of the site to refer to or activates related link information, at step S31 the browser 21 downloads the display program 11 from the thus-identified web server 1. At step S32, the browser 21 executes the downloaded display program 11. Since the display program 11 is a program that executes the process shown in FIG. 1C. Therefore, if the browser 21 executes it, the moving image is displayed on the display screen 22.

<Embodiment 1>

Figure 2:
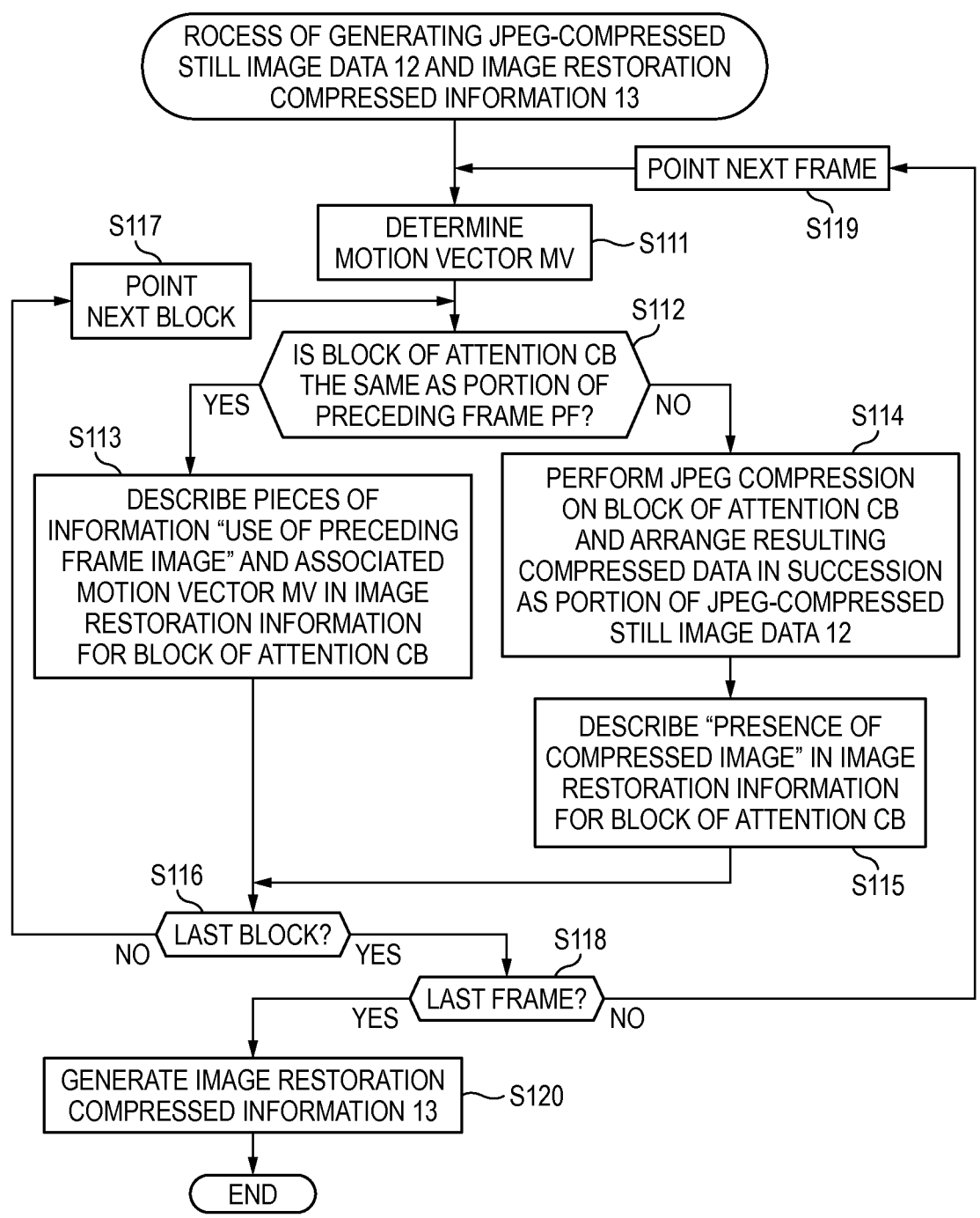
FIG. 2 is a flowchart of a process of generating JPEG-compressed still image data 12 and image restoration compressed information 13 in a moving image reproduction method and a moving image reproduction system according to a first embodiment of the invention using what is called a moving image constituent images JPEG compression method with interframe motion compensation.
Figure 3A:
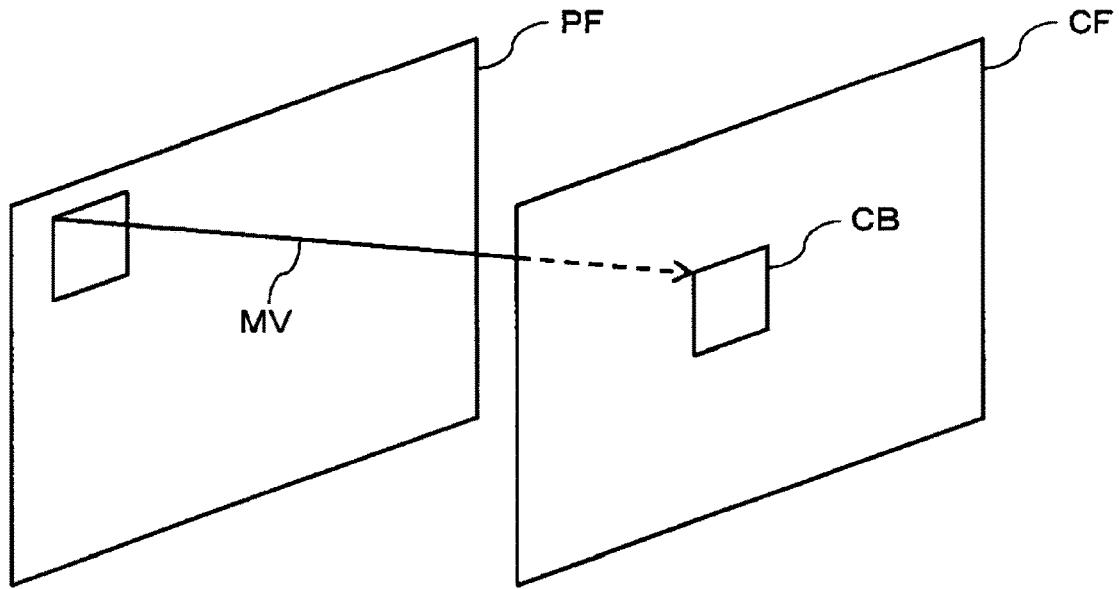
FIGS. 3A and 3B illustrate the process of generating JPEG-compressed still image data 12 and image restoration compressed information 13 in the first embodiment.
Figure 3B:
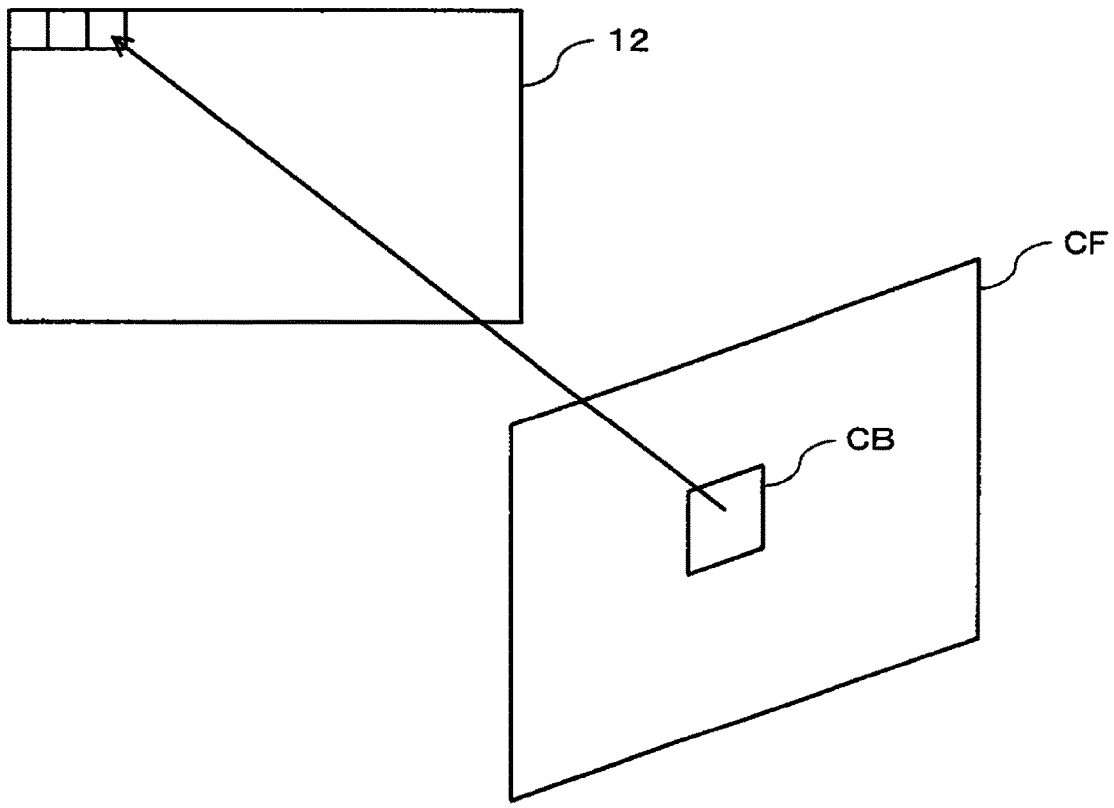

FIG. 2 is a flowchart of a process of generating JPEG-compressed still image data 12 and image restoration compressed information 13 in a moving image reproduction method and a moving image reproduction system according to a first embodiment of the invention using what is called the moving image constituent images JPEG compression method with interframe motion compensation. FIGS. 3A and 3B illustrate the process of generating JPEG-compressed still image data 12 and image restoration compressed information 13.

As outlined above, for the purpose of handling moving image data formed of plural frames as JPEG-compressed still images, the frames are processed sequentially starting from the head frame in units of a block of 8×8 pixels which is a unit of processing of JPEG. First, at step S111, to secure motion compensation, a motion vector MV is determined from a relationship between the preceding frame and the block of attention CB. A motion vector MV can be determined on the basis of squared errors between pixel values of the image of the preceding frame PF and the block of attention CB. At step S112, it is judged on the basis of the determined motion vector MV whether or not the block of attention CB of the frame of attention CF coincides with a portion of the preceding frame PF. If it is judged that the preceding frame PF has a portion that is regarded as the same as the block of attention CB (affirmative judgment), at step S113 pieces of information of "use of a preceding frame image" and the determined motion vector MV (see FIG. 3A) are described in image restoration information for the block of attention CB. Then the process moves to step S116.

As for the manner of description of the above pieces of information at step S113, block-of-attention identification information and the pieces of information corresponding to it, that is, "use of a preceding frame image" and the motion vector MV information, are assigned to each of R, G, and B values of a still image according to a certain rule. According to this, these pieces of information can be recognized also when the entire image restoration information is expanded and restored after compression in PNG format.

On the other hand, if it is judged at step S112 that no portion in the preceding frame PF is regarded as the same as the block of attention CB (negative judgment), at step S114 the block of attention CB is subjected to JPEG compression and resulting compressed data is arranged in succession as a portion of JPEG-compressed still image data 12 (see FIG. 3B). The JPEG compression processing performed here is common processing. That is, it includes discrete cosine transform processing, quantization processing, and entropy coding processing such as Huffman coding or arithmetic coding. At step S115, "presence of a compressed image" is described in the image restoration information for the block of attention CB. Then the process moves to step S116.

As for the manner of description of this information at step S115, block-of-attention identification information and the information "presence of a compressed image" corresponding to it are assigned to each of R, G, and B values of a still image according to a certain rule. According to this, these pieces of information can be recognized also when the entire image restoration information is expanded and restored after compression in PNG format.

At step S116, it is judged whether or not the block of attention CB is the last block of the one frame. If the block of attention CB is not the last block (negative judgment), the next block is pointed at step S117 and the process returns to step S112. If the block of attention CB is the last block (affirmative judgment), then it is judged at step S118 whether or not the frame of attention CF is the last frame. If it is judged that the frame of attention CF is not the last frame (negative judgment), the next frame is pointed at step S119 and the process returns to step S111. On the other hand, if it is judged that the frame of attention CF is the last frame (affirmative judgment), the process moves to step S120 because it means that the JPEG-compressed still image data 12 have just been completed. At step S120, image restoration compressed information 13 is generated by compressing the completed image restoration information in PNG format. As mentioned above, the thus-generated JPEG-compressed still image data 12 and image restoration compressed information 13 are stored in the web server 1.

As compressed image data obtained by JPEG compression are set in succession as portions of a still image at step S114, they may exceed an assumed single-still-image capacity of the client terminal 2. In this case, JPEG-compressed still image data 12 is formed as plural still images.

Figure 4:
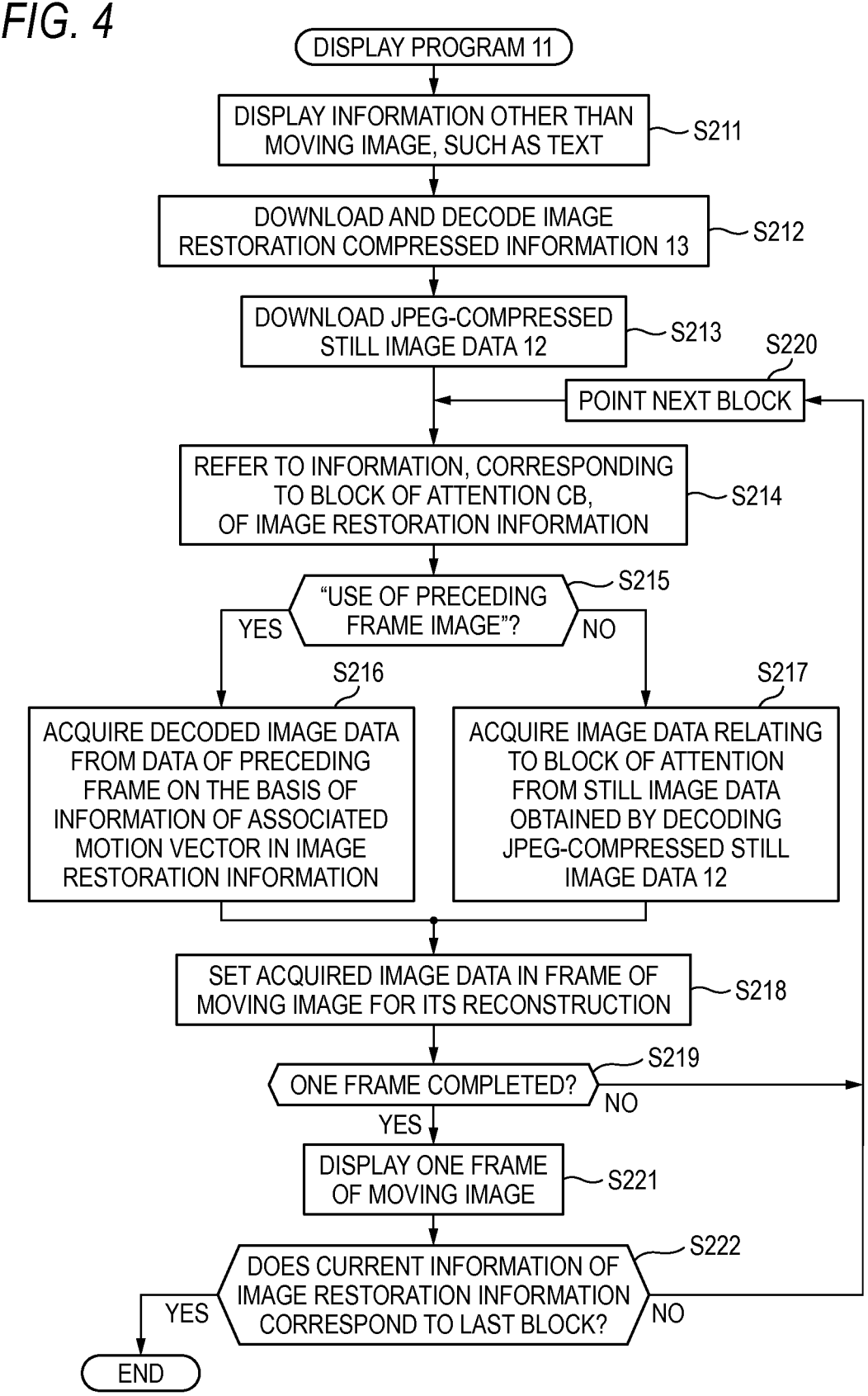
FIG. 4 is a flowchart of a process that corresponds to the process shown in FIG. 2 and that is executed in the moving image reproduction method and the moving image reproduction system according to the first embodiment of the invention by a display program 11 which is downloaded, interpreted, and executed by a browser 21 of a client terminal 2.

FIG. 4 is a flowchart of a process that corresponds to the process shown in FIG. 2 and that is executed in the moving image reproduction method and the moving image reproduction system according to the first embodiment of the invention by the display program 11 which is downloaded, interpreted, and executed by the browser 21 of the client terminal 2. That is, the display program 11 is written as the following process that corresponds to the generation method of the JPEG-compressed still image data 12 and the image restoration compressed information 13 prepared.

First, if pieces of information (e.g., a text) other than a moving image exist as information that the information referencing party wants to display on the display screen 22 of his or her client terminal 2, those pieces of information are displayed at step S211. At step S212, the image restoration compressed information 13 is downloaded from the web server 1 and decoded, whereby the image restoration information is restored. At step S213, the JPEG-compressed still image data 12 are downloaded and decoded, whereby still image data are obtained.

At the following steps, to reconstruct the moving image, pieces of information, corresponding to respective blocks, in the image restoration information obtained by the decoding processing are referred to in succession. That is, the image restoration information is referred to at step S214. At step S215, it is judged whether or not an image of the preceding frame was used for the block of attention CB. If an image of the preceding frame was used for the block of attention CB (affirmative judgment), at step S216 decoded image data is acquired from the data of the preceding frame on the basis of information of an associated motion vector MV in the image restoration information.

On the other hand, if it is judged at step S215 that no image of the preceding frame was used for the block of attention CB, it means that information that should be employed as information of the block of attention CB exists in the next block of the still image data obtained by decoding at step S213. Therefore, this image data is acquired at step S217.

At step S218, the decoded image data obtained from the data of the preceding frame at step S216 or the image data obtained at step S217, that is, the image data in the next block of the decoded still image data, is employed as image data relating to the block of attention CB and set in place in the frame of a moving image for its reconstruction.

Now, a specific method for employing image data selectively as data in a frame of a moving image will be described. HTML5 is provided with a tag called "canvas." Instead of constructing an image in a prescribed manner, a moving image can be constructed in a creative manner by performing optional processing such as image drawing by JavaScript in an image drawing area defined by this tag. For example, the canvas tag has a description <canvas id="canvas" width=" 600 height="480">. In this specific example, a drawing area of 600×480 pixels is prepared. An image can be described in this area using, for example, "drawingimage API" of JavaScript. Thus, block image data, identified using a motion vector MV, of information of the immediately preceding frame that is stored in a frame buffer and has been reconstructed in the image drawing area prescribed by a canvas tag or block image data obtained by newly decoding information in JPEG-compressed still image data 12 can be placed selectively in the image drawing area.

At step S219, it is judged whether or not one frame has been completed by the image data that was acquired selectively at step S218. If one frame has not been completed yet (negative judgment), the next block is employed as the block of attention CB at step S220 and the process returns to step S214. On the other hand, if one frame has been completed, at step S221 processing of displaying the one frame via a frame buffer is performed. At step S222, it is judged whether information, relating to the last block, of the image restoration information has been reached or not. If that information has not been reached yet (negative judgment), the process moves to step S220. On the other hand, If that information has been reached (affirmative judgment), the process is finished. Thus, the above-described process can display a moving image that was prepared by the information providing party before encoding in an image drawing area defined by a canvas tag.

According to the above-described first embodiment, the browser 21 displays a moving image on the client terminal 2 using the still image decoder that is standard-equipped in the browser 21 instead of a plug-in or the like of a moving image decoder. This lightens the necessary advance processing and enhances the versatility. Furthermore, a necessary display rate can be secured because the still image decoder is used differently than in the case of a flipbook-like moving image in which individual frames are decoded independently to produce a moving image, that is, information of an original moving image is converted into compressed still images using interframe motion compensation. However, interframe differential compression processing is not employed, because it would make the load of the decoding processing unduly heavy.

<Embodiment 2>

In the above-described first embodiment, whether the preceding frame can be used or not is judged in units of the minimum block (i.e., the block formed of 8×8 pixels which is the basic unit of JPEG compression). However, it is preferable to use as large a region of the preceding frame as possible; it is preferable to use data of 2×2 blocks or 4×4 blocks of the preceding frame if coincidence is found in a region having that size. This makes it possible to simplify the process of generating JPEG-compressed still image data 12 and image restoration compressed information 13 and to reduce the information amount of the image restoration compressed information 13. In view of this, the second embodiment employs a four-branch tree process with three block sizes. However, the number of block sizes is not limited to three.

Figure 5:
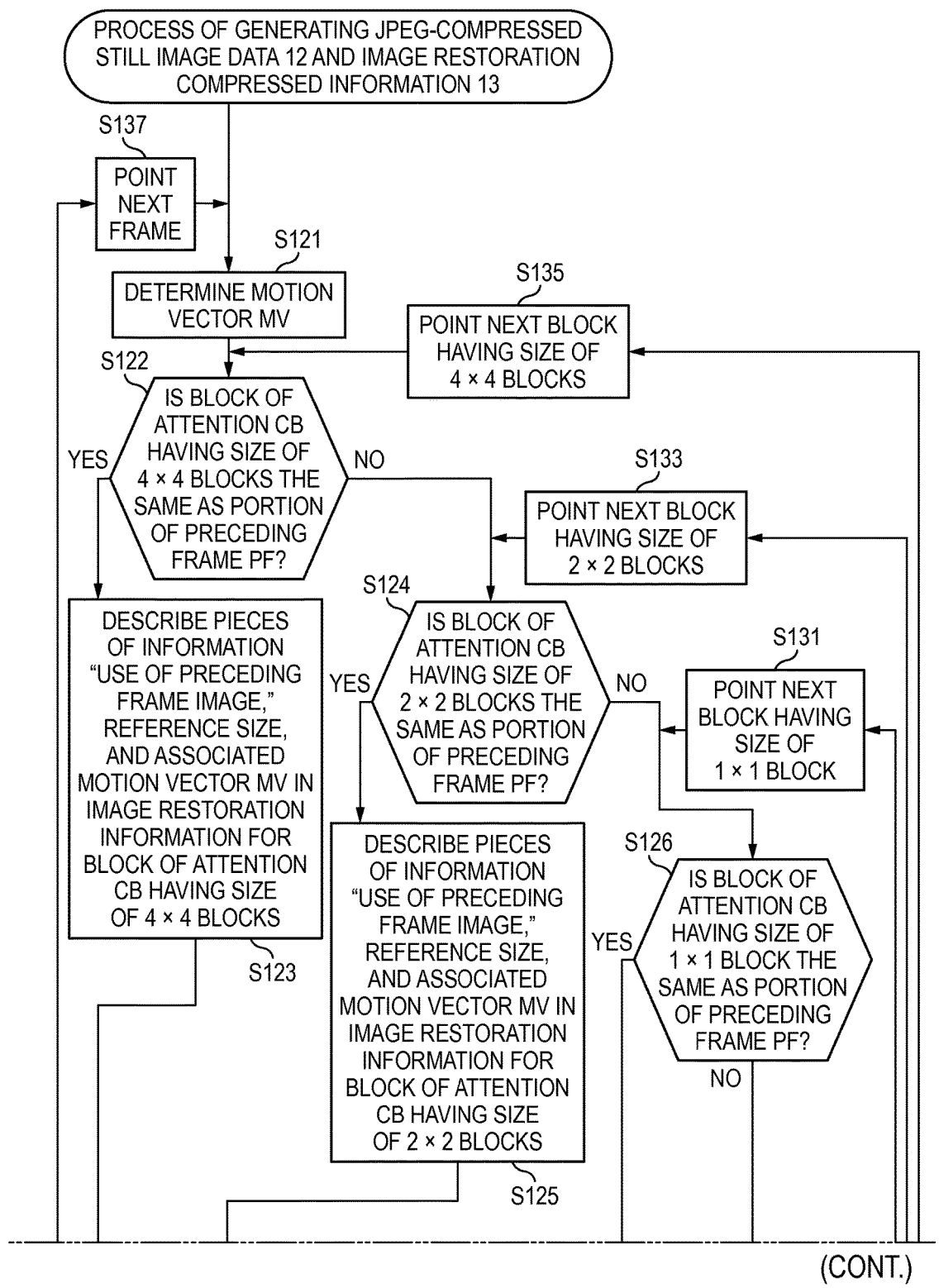
FIG. 5 is a flowchart of a process of generating JPEG-compressed still image data 12 and image restoration compressed information 13 in a moving image reproduction method and a moving image reproduction system according to a second embodiment of the invention using what is called the moving image constituent images JPEG compression method with interframe motion compensation.
Figure 6A:
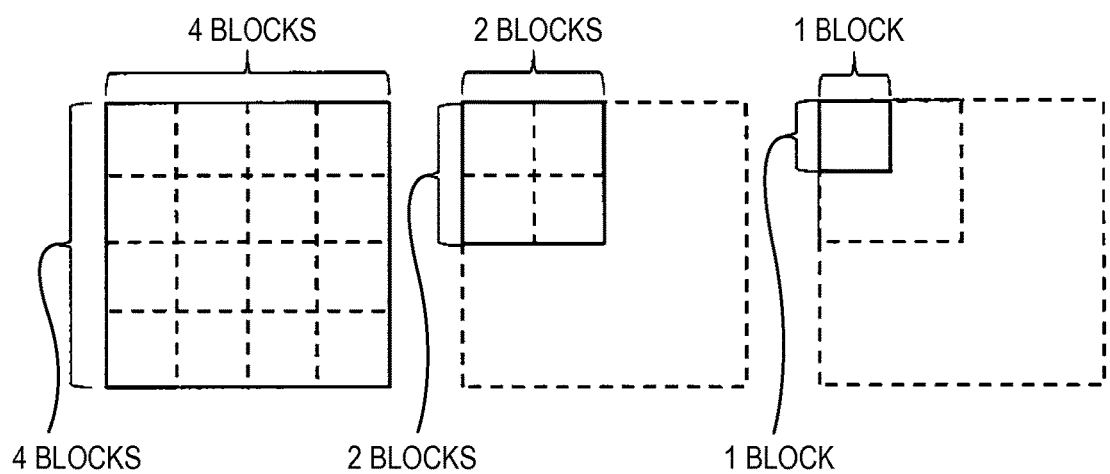
FIGS. 6A and 6B illustrate the process of generating JPEG-compressed still image data 12 and image restoration compressed information 13 in the second embodiment.
Figure 6B:
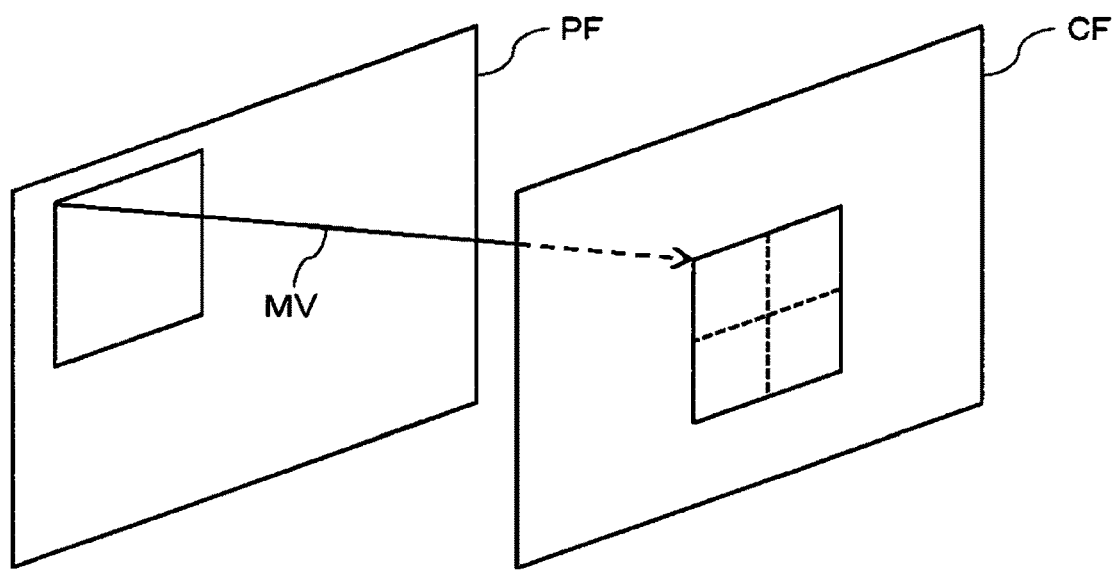

FIG. 5 is a flowchart of a four-branch tree process with three block sizes which is executed in the second embodiment to generate JPEG-compressed still image data 12 and image restoration compressed information 13. FIGS. 6A and 6B illustrate the process of generating JPEG-compressed still image data 12 and image restoration compressed information 13 in the second embodiment.

As mentioned above and as shown in FIG. 6A, the second embodiment employs three processing block sizes. More specifically, at the beginning, the size of the block of attention CB is set to 4×4 blocks. If no coincidence is found, the size of the block of attention CB is switched to 2×2 blocks. If still no coincidence is found, the size of the block of attention CB is switched to a 1×1 block.

Referring to FIG. 5, first, at step S121, to secure motion compensation, a motion vector MV is determined from a relationship between the preceding frame and the block of attention CB. At step S122, it is judged on the basis of the determined motion vector MV whether or not the block of attention CB having the size of 4×4 blocks of the frame of attention CF coincides with a portion of the preceding frame PF. If it is judged that the preceding frame PF has a portion that is regarded as the same as the block of attention CB having the size of 4×4 blocks (affirmative judgment), at step S123 pieces of information of "use of a preceding frame image," the reference size (4×4), and the determined motion vector MV (see FIG. 6B) are described in image restoration information for the block of attention CB having the size of 4×4 blocks. Then the process moves to step S134.

As for the manner of description of the above pieces of information at step S123, block-of-attention identification information and the pieces of information corresponding to it, that is, "use of a preceding frame image," the reference size information, and the motion vector MV information, are assigned to each of R, G, and B values of a still image according to a certain rule so that these pieces of information can be recognized also when the entire image restoration information is expanded and restored after compression in PNG format.

On the other hand, if it is judged at step S122 that no portion in the preceding frame PF is regarded as the same as the block of attention CB having the size of 4×4 blocks (negative judgment), then it is judged at step S124 whether or not a block of attention CB having the size of 2×2 blocks in the block of attention CB having the size of 4×4 blocks coincides with a portion of the preceding frame PF. If it is judged that the preceding frame PF has a portion that is regarded as the same as the block of attention CB having the size of 2×2 blocks (affirmative judgment), at step S125 pieces of information of "use of a preceding frame image," the reference size (2×2), and the determined motion vector MV (see FIG. 6B) are described in the image restoration information for the block of attention CB having the size of 2×2 blocks. Then the process moves to step S132.

On the other hand, if it is judged at step S124 that no portion in the preceding frame PF is regarded as the same as the block of attention CB having the size of 2×2 blocks (negative judgment), then it is judged at step S126 whether or not a block of attention CB having the size of a 1×1 block in the block of attention CB having the size of 2×2 blocks coincides with a portion of the preceding frame PF. If it is judged that the preceding frame PF has a portion that is regarded as the same as the block of attention CB having the size of a 1×1 block (affirmative judgment), at step S127 pieces of information of "use of a preceding frame image," the reference size (1×1), and the determined motion vector MV are described in the image restoration information for the block of attention CB having the size of a 1×1 block. Then the process moves to step S130.

On the other hand, if it is judged at step S126 that no portion in the preceding frame PF is regarded as the same as the block of attention CB having the size of a 1×1 block (negative judgment), at step S128 the block of attention CB having the size of a 1×1 block is subjected to JPEG compression and resulting compressed data is arranged in succession as a portion of JPEG-compressed still image data 12 in the same manner as in the first embodiment (see FIG. 3B). The JPEG compression processing performed here is common processing. At step S129, "presence of a compressed image" is described in the image restoration information for the block of attention CB having the size of a 1×1 block. Then the process moves to step S130.

As for the manner of description of this information at step S129, block-of-attention identification information and the information "presence of a compressed image" corresponding to it are assigned to each of R, G, and B values of a still image according to a certain rule so that these pieces of information can be recognized also when the entire image restoration information is expanded and restored after compression in PNG format.

At step S130, it is judged whether or not the block of attention CB having the size of a 1×1 block is the last block having the size of a 1×1 block in the block of attention CB having the size of 2×2 blocks. If the block of attention CB having the size of a 1×1 block is not the last block having the size of a 1×1 block (negative judgment), the next block having the size of a 1×1 block is pointed at step S131 and the process returns to step S126. On the other hand, if the block of attention CB having the size of a 1×1 block is the last block having the size of a 1×1 block (affirmative judgment), the process moves to step S132.

At step S132, it is judged whether or not the block of attention CB having the size of 2×2 blocks is the last block having the size of 2×2 blocks in the block of attention CB having the size of 4×4 blocks. If the block of attention CB having the size of 2×2 blocks is not the last block having the size of 2×2 blocks (negative judgment), the next block having the size of 2×2 blocks is pointed at step S132 and the process returns to step S124. On the other hand, if the block of attention CB having the size of 2×2 blocks is the last block having the size of 2×2 blocks (affirmative judgment), the process moves to step S134.

At step 134, it is judged whether or not the block of attention CB having the size of 4×4 blocks is the last block having the size of 4×4 blocks in the subject frame CF. If the block of attention CB having the size of 4×4 blocks is not the last block having the size of 4×4 blocks (negative judgment), the next block having the size of 4×4 blocks is pointed at step S135 and the process returns to step S122. On the other hand, the block of attention CB having the size of 4×4 blocks is the last block having the size of 4×4 blocks in the subject frame CF (affirmative judgment), the process moves to step S136.

At step S136, it is judged whether the subject frame CF is the last frame or not. If the subject frame CF is not the last frame (negative judgment), the next frame is pointed at step S137 and the process returns to step S121. On the other hand, if the subject frame CF is the last frame (affirmative judgment), the process moves to step S138 because it means that the JPEG-compressed still image data 12 have just been completed. At step S138, image restoration compressed information 13 is generated by compressing the completed image restoration information in PNG format. The thus-generated JPEG-compressed still image data 12 and image restoration compressed information 13 are stored in the web server 1.

As compressed image data obtained by JPEG compression are set in succession as portions of a still image at step S128, they may exceed an assumed single-still-image capacity of the client terminal 2. In this case, as in the first embodiment, JPEG-compressed still image data 12 is formed as plural still images.

A process that is executed by a display program 11 that corresponds the process shown in FIG. 5 which is executed in the second embodiment to generate JPEG-compressed still image data 12 and image restoration compressed information 13 would be apparent to those skilled in the art from the correspondence between the processes shown in FIGS. 2 and 4 which are executed in the first embodiment and hence will not be described in detail. Put in simple words, in the second embodiment, the steps that follow step S215 in the process of FIG. 4 are changed to layered steps.

The above-described second embodiment provides, in addition to the advantages of the first embodiment, advantages that the process of generating JPEG-compressed still image data 12 and image restoration compressed information 13 is simplified and the information amount of the image restoration compressed information 13 is decreased.
<Embodiment 3>

Figure 7:
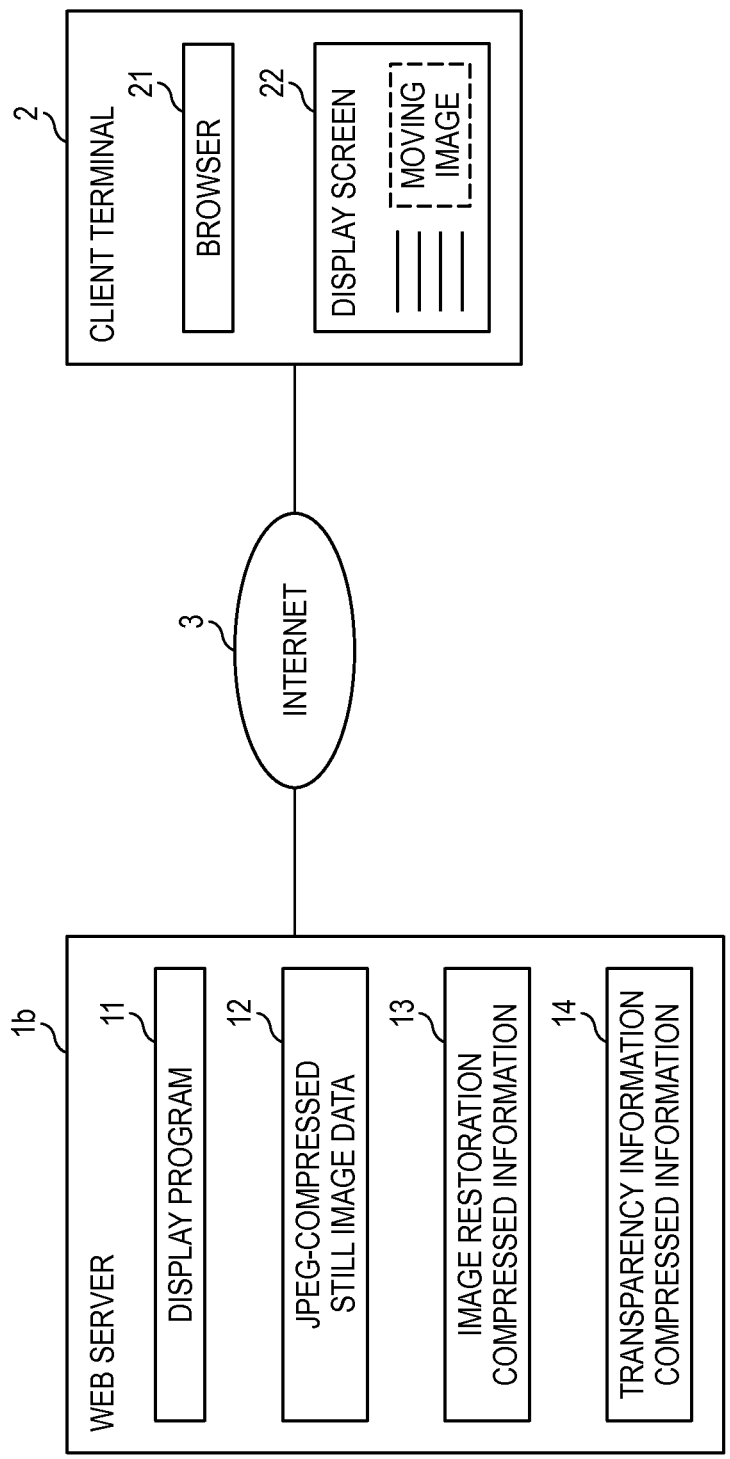
FIG. 7 shows a moving image reproduction method and a moving image reproduction system according to a third embodiment of the invention.

FIG. 7 is for description of a moving image reproduction method and a moving image reproduction system according to a third embodiment of the invention. The third embodiment is a modification of the first or second embodiment. More specifically, the third embodiment introduces transparency information. As shown in FIGS. 3A and 3B, a web server 1b used in the third embodiment is provided with transparency information compressed information 14 in addition to a display program 11, JPEG-compressed still image data 12, and image restoration compressed information 13.

Like the image restoration compressed information 13, the transparency information compressed information 14 is compressed information obtained by encoding in PNG format. And the transparency information compressed information 14 can provide transparency information in the form of an alpha channel. The display program 11 is written so as to decode the transparency information compressed information 14 using the same vectors as for the JPEG-compressed still image data 12 and to reconstruct a moving image from the JPEG-compressed still image data 12 by incorporating the transparency information into it.

The employment of the transparency information makes it possible to reproduce plural moving images in superimposition by giving pieces of transparency information to plural respective moving images when they are reproduced on the display screen 22 of the client terminal 2.

In each of the above embodiments, JPEG is employed as a method for compression-coding moving image data into still image data. Alternatively, the PNG method may be used for this purpose as in generating image restoration compressed information 13. Thus, PNG-compressed still image data can also be provided.

INDUSTRIAL APPLICABILITY

For example, the moving image reproduction method can be applied to reproduction of moving images on smartphones.

What is claimed is:

1. A moving image reproduction system comprising:
a client terminal that is provided with a browser; and
a web server that is connected to the client terminal via a network,
wherein the web server stores compressed still image data formed JPEG and image restoration information formed base 64 format or as PNG image data in separate files, the compressed still image data and the image restoration information being prepared by the web server, the image restoration information being information referred to by the browser to reconstruct a moving image from the still image data, and the web server being configured to perform a process comprising:
dividing data of each of plural frames of a moving image to be displayed on the browser of the client terminal into macro blocks;
determining whether each of the macro blocks has same information as in a preceding frame;
encoding, with JPEG format that is decodable with a still image decoder incorporated in the browser of the client terminal, image data of each macro block for which the preceding frame does not have the same information to generate compressed still image data;
generating first reference information with respect to the macro blocks that do not have the same information that is in the preceding frame;
generating second reference information with respect to the macro blocks deemed to have the same information that is in the preceding frame, the second reference information including a motion vector;
generating the image restoration information including the first reference information and the second reference information formed base 64 format or as PNG image data, the image restoration information not employing interframe differential compression processing; and providing the image restoration information formed base 64 format or as PNG image data to the client terminal; and providing the compressed still image data in JPEG format to the client terminal separate from the image restoration information, wherein the client terminal is configured to perform, based on a JavaScript program, a process comprising:

obtaining the first reference information and the second reference information from the image restoration information formed base 64 format or as PNG image data;

decoding the compressed still image data in JPEG format with a still image decoder incorporated into the browser after the obtaining of the first reference information and the second reference information;

obtaining image data with respect to each macro block associated with the first reference information in the image restoration information;

using, by the browser, image data from a received frame based on the motion vector for each macro block associated with the second reference information in the image restoration information; and reconstructing by the browser the moving image formed by the plural frames.

2. The moving image reproduction system according to claim 1, wherein in judging whether the preceding frame has the same information, a range formed of n ×n macro blocks being a range for the judgment as to presence/absence of same information is reduced by decreasing k where n indicates $2^k$ and k indicates an integer that is larger than or equal to 1.

3. The moving image reproduction system according to claim 1, wherein the browser interprets a description language based on HTML5.

4. The moving image reproduction system according to claim 1, wherein an area displaying the moving image at the client terminal is an image drawing area defined by a "canvas" tag of HTML5.

5. The moving image reproduction system according to claim 1, wherein the compressed still image data is generated as a plurality of divided compressed still image data in accordance with a still image handling capacity of the client terminal.

6. The moving image reproduction system according to claim 1, wherein transparency information compressed information is generated by encoding information relating to transparency of the moving image as an alpha channel, and the moving image is reconstructed from the compressed still image data by decoding the transparency information compressed information and by incorporating the information relating to transparency.

7. The moving image reproduction system according to claim 1, wherein the obtaining of the first reference information and the second reference information from the image restoration information comprises decoding the image restoration information formed base 64 format or as PNG image data.

* * * * *